Dec. 8, 1936.  P. BERNARD  2,063,785
CATTLE DEHORNER
Filed Aug. 28, 1935  2 Sheets-Sheet 1
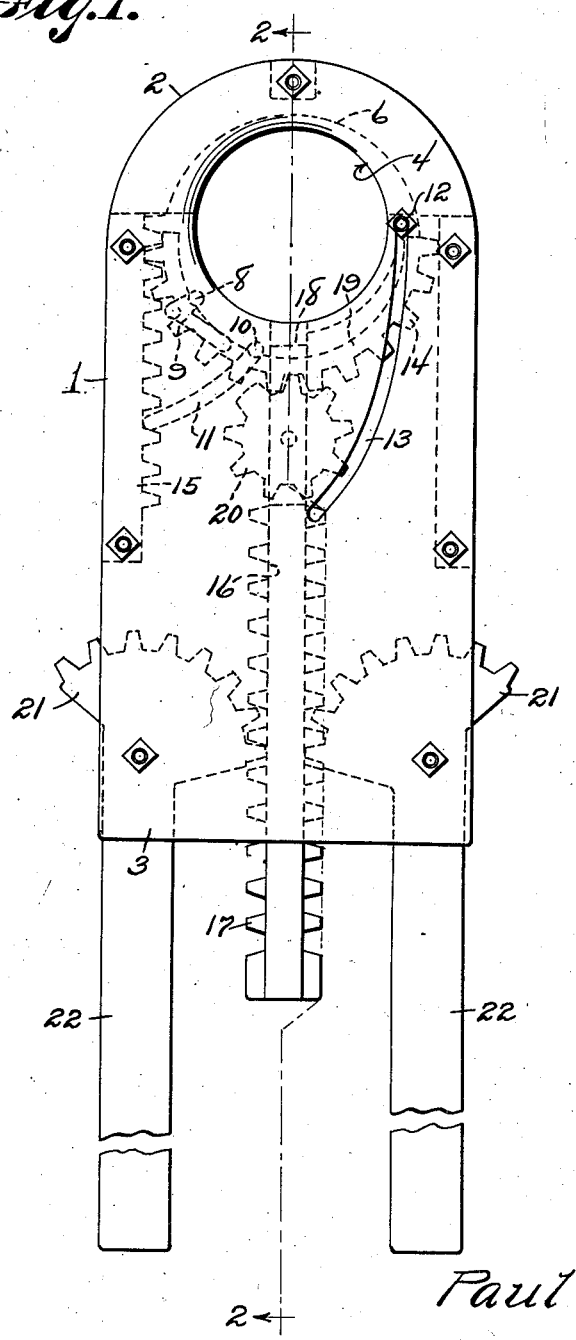
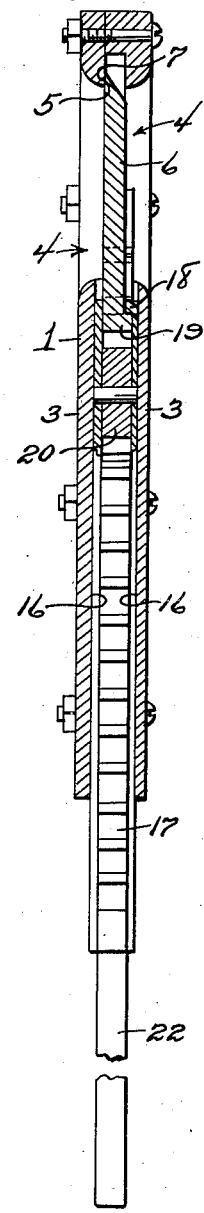
Paul Bernard
INVENTOR
BY Victor J. Evans & Co.
ATTORNEY

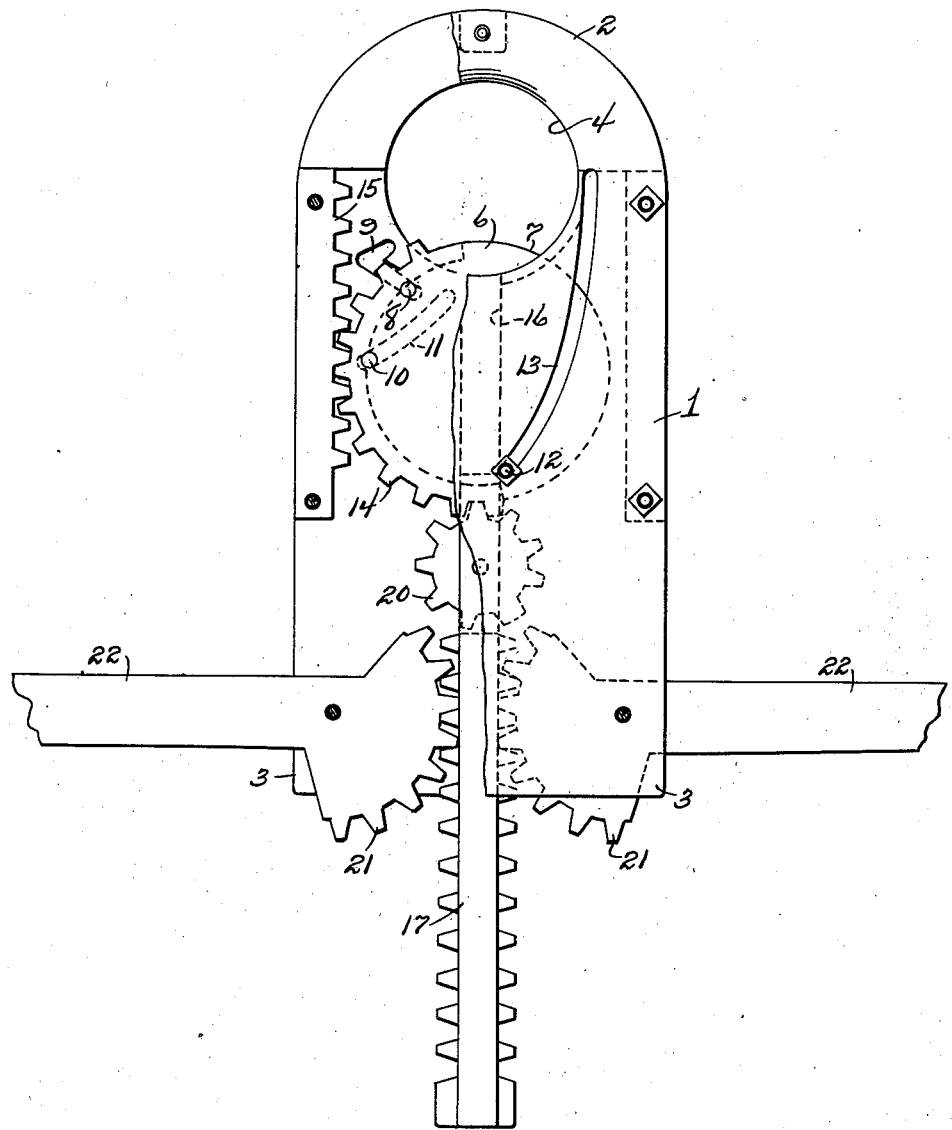

Patented Dec. 8, 1936

2,063,785

UNITED STATES PATENT OFFICE 2,063,785

CATTLE DEHORNER

Paul Bernard, Sioux Falls, S. Dak.

Application August 28, 1935, Serial No. 38,280

3 Claims. (Cl. 128—308)

This invention relates to cattle dehorners, and has for the primary object the provision of a device of this character which may be readily adapted to a horn and is easily operated to bring about efficient and complete severance of the horn on the part of the operator and without danger of mutilation to the horn stub or that portion of the horn remaining on the animal.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a cattle dehorner constructed in accordance with my invention.

Figure 2 is a sectional view taken on the line 2—2 of Figure 1.

Figure 3 is a fragmentary sectional view showing the dehorner in a non-cutting position.

Referring in detail to the drawings, the numeral 1 indicates an elongated body having a rounded end 2 and is constructed from relatively spaced plates 3 suitably secured together. The plates 3 adjacent the rounded end are provided with oppositely arranged openings 4 for the reception of horns of an animal. The walls of the openings 4 are curved to define cutting edges 5 between which operates a disc-like blade 6 having a cutting edge 7. A pin 8 is secured to the blade 6 adjacent one edge thereof and fits in a groove 9 of one of the plates 3. The pin and groove cooperate in forming a movable or shiftable pivot for the blade. A pin 10 is carried by the blade 6 and operates in a curved slot 11 formed in one of the plates 3 for the purpose of guiding the movement of the blade into and out of cutting position. A pin 12 is carried by the blade and operates in curved slots 13 formed in the plates 3 and cooperates with the pin 10 and groove 11 in guiding the movement of the blade into and out of cutting position. Formed on the periphery of the blade 6 and extending approximately one-half of the circumference of said blade are teeth 14 meshing with a fixed rack bar 15 carried by the plates 3. The teeth meshing with the rack bar 15 causes a rotation of the blade during its pivotal movement.

The opposed faces of the plates 3 have formed therein grooves 16 arranged opposite to one another to provide a guide for a slidable rack bar 17, one end of which is offset to form a lip 18 engageable with a flange 19 formed on the blade. Journaled in the rack bar is a pinion 20 meshing with the teeth 14 and cooperating with the lip 18 and flange 19 in movably connecting the rack bar to the blade. Pivoted to the plates 3 are segmental shaped racks 21 meshing with the rack bar 17 and each equipped with a handle 22 projecting outwardly of the plate whereby the rack bar may be caused to slide in opposite directions for the purpose of moving the blade into and out of cutting position.

In operation, an animal's horn is passed through the openings 4 and the levers 22 are actuated, causing the blade to sever the horn by cooperating with the cutting edges 5. The blade on moving from non-cutting position to cutting position pivots and also rolls. These combined movements of the blade will bring about quick and efficient severance of the horn. The blade 6 rolls outwardly with its center moving in a straight line along the axis of the rack bar 17, by reason of its teeth 14 meshing with the fixed rack bar 15. The teeth 14 and bar 15 are kept in mesh by the constraint of the pins 8, 10, and 12 moving in slots 9, 11, and 13, respectively. A rolling contact of the circular blade 6 on bar 15 will cause any given point on its surface to generate a cycloid curve. From this fact each of the slots 9, 11, and 13 is made as the arc of a prolate cycloid generated by the pins 8, 10, and 12, respectively, secured to the blade 6 within the pitch circle of teeth 14 and moving as described above. The slots thus established, it is impossible for the blade to move but as intended.

Having described the invention, I claim:

1. A cattle dehorner comprising a body having a horn receiving opening and provided with cutting edges, a disc-like blade movable between said cutting edges, a pivotal and slidable connection between the blade and the body, teeth on said blade, a rack bar fixed to the body and meshing with the teeth for causing rotation of the blade during the pivotal movement thereof, a rack bar slidably secured to the body, means slidably connecting the second-named rack bar to the blade, a pinion journaled to the rack bar and meshing with the teeth of the blade, segmental racks pivoted to the body and meshing with the second-named rack bar, and levers integral with said segmental rack.

2. A cattle dehorner comprising a body having a pair of guide grooves disposed angularly to each other and one of said grooves terminating at one end in an angularly disposed branch, annular cutting edges on said body, a circular knife blade movable relative to the cutting edges, teeth formed on the blade, a rack bar fixed to the body and meshing with the teeth of the blade, a pivot pin secured to the blade and extending into the groove having the branch and movable from one end thereof to the opposite end and into and out of the branch whereby the blade may shift the pivot thereof on the body, a guide pin secured to the blade and extending into the other groove to cause the blade to roll as it pivots and thereby move relative to the cutting edges, and means for imparting movement to the blade.

3. A cattle dehorner comprising a body having a pair of guide grooves disposed angularly to each other and one of said grooves terminating at one end in an angularly disposed branch, annular cutting edges on said body, a circular knife blade movable relative to the cutting edges, teeth formed on the blade, a rack bar fixed to the body and meshing with the teeth of the blade, a pivot pin secured to the blade and extending into the groove having the branch and movable from one end thereof to the opposite end and into and out of the branch whereby the blade may shift the pivot thereof on the body, a guide pin secured to the blade and extending into the other groove to cause the blade to roll as it pivots and thereby move relative to the cutting edges, a flange secured to the blade, a slidable rack bar carried by the body and having an offset end contacting the flange, a pinion journaled on the slidable rack bar and meshing with the teeth of the blade, and means for imparting sliding movement to the slidable rack bar.

PAUL BERNARD.